United States Patent [19]

Sugerman et al.

[11] Patent Number: 4,753,848
[45] Date of Patent: Jun. 28, 1988

[54] BONDING OF HALOGENATED ORGANIC COMPOUNDS

[75] Inventors: Gerald Sugerman, Allendale, N.J.; Salvatore J. Monte, Staten Island, N.Y.

[73] Assignee: Kenrich Petrochemicals, Inc., Bayonne, N.J.

[21] Appl. No.: 930,712

[22] Filed: Nov. 13, 1986

[51] Int. Cl.⁴ .................... B32B 7/04; B32B 27/38
[52] U.S. Cl. ......................... 428/420; 428/422; 428/421; 428/476.3; 428/475.8; 428/470; 428/483; 428/516; 428/519; 428/702; 428/704; 427/322; 427/327; 556/17
[58] Field of Search .............. 428/420, 422, 702, 704, 428/421, 516, 476.3, 483, 519, 470; 427/327, 322

[56] References Cited

U.S. PATENT DOCUMENTS 4,623,591  11/1986  Pike ........................................ 428/702

Primary Examiner—P. C. Ives
Attorney, Agent, or Firm—Bert J. Lewen; Henry Sternberg

[57] ABSTRACT

Halocarbons are readily bonded to a variety of substrates, including metals, polyolefins, styrenics, polyamides and thermoplastic polyesters, by treating the surface(s) to be bonded with a neoalkoxy zirconate compound. The articles produced by the aforesaid process resist delamination. Applicable fluorinated compounds include fluorinated polymers such as Teflon. The specific zirconate compound preferred is dependent on the particular substrate and the halogenated organic compound to be bonded. Preferred are organo-zirconates having one of the following formulas:

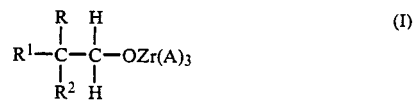

(I)

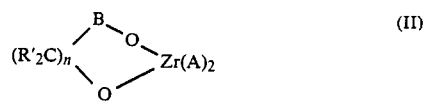

(II)

wherein R, R¹ and R² are each monovalent hydrocarbon groups or substantive derivatives thereof; the A groups are independently selected from diester phosphates, diester pyrophosphates, oxyalkylamino, oxyalkylarylamino, or sulfonyl groups; B is an R'₂C group or a carbonyl group; R' is a hydrogen group or an alkyl group having from 1 to 6 carbon atoms; and n is 1 or 2.

9 Claims, No Drawings

BONDING OF HALOGENATED ORGANIC COMPOUNDS

BACKGROUND OF THE INVENTION

It has long been desirable to bond halocarbons to a variety of substrates. Unfortunately, such compounds, particularly the fluorinated hydrocarbons such as Teflon, are extremely difficult to bond because of their inert chemical characteristics.

It is desirable to achieve a good bond between halocarbons and substrates for cable insulation, self-lubrication coatings for bearings, acid-resistant linings for tanks, non-stick surfaces for cookware and bakeware, permeation-resistant seals and sealers to tires, e.g., halobutyl tire liners to natural rubber carcass material.

The use of certain zirconium compounds to enhance the retention of fluorinated hydrocarbons to yarn has been described in U.S. Pat. Nos. 4,423,113 and 4,317,859. Applicants' co-pending U.S. patent application Ser. No. 651,119, filed Sept. 14, 1984, now U.S. Pat. No. 4,634,785, shows that certain titanium and zirconium pyrophosphates can be used to improve adhesion of paint primers and polyesters to fiberglass. These materials, however, have not proven to be useful for bonding halogenated compounds.

BRIEF DESCRIPTION OF THE INVENTION

In accordance with the instant invention, it has been discovered that halocarbons may be readily bonded to a variety of substrates by treating their interface with selected neoalkoxy zirconate compounds. While the mechanism of this unexpected finding is not exactly clear, it is believed that the efficacy of the invention is based on the ability of the zirconate atom to extract the halogen atom from the organic material and replace the halogen with another ligand which is readily bonded to the substrate.

The neoalkoxy zirconates of the invention are described in detail in U.S. Pat. No. 4,623,738, issued Nov. 18, 1986, the disclosure of which is incorporated by reference herein.

The compounds used in the instant invention are advantageous over those described in the aforesaid U.S. patents in that the halogenated organo-materials are more effectively bonded to the substrate, such materials can be firmly bonded to substrates other than fibers and fabrics, and such materials give improved results in bonding to nylon.

DETAILED DESCRIPTION OF THE INVENTION

Halocarbons such as Teflon consist essentially of a carbon-to-carbon backbone having appendant halogen atoms attached thereto. Because of the stability of the carbon-to-halogen bond, these compounds have been found to be highly resistant to adhesion. It is well known, for example, that such materials are used where resistance to sticking is desirable. For example, pots and pans are frequently clad with such materials.

While this "stick-resistance" is desirable for certain purposes, it presents a major problem when it becomes necessary to bond the halocarbons to other materials. Clearly, in the kitchenware application, the Teflon cannot be used without being supported on a proper metal substrate, the latter being necessary for its structural and heat conducting characteristics.

In accordance with the instant invention, it has been found that, if the halocarbon or the substrate which is to be bonded is treated with selected neoalkoxy zirconates, a strong adhesive bond to the substrates is formed.

Examples of the halocarbons which may be bonded in accordance with the instant invention include monomeric and polymeric materials. Examples of the latter are Teflon, Kel-F perfluorooctene, perfluorooctanoylglycine, chloronaphthalene, and chlorinated polyethylene.

Other fluorinated compounds may be used, such as those containing a saturated aliphatic radical which contains 3 to 20 carbon atoms, preferably 6 to 12, and a carbon-bonded fluorine content of 40–78 wt. %, preferably 50–77 wt. %. Preferably, the aliphatic radical is perfluoroalkyl, $C_nF_{2n+1}$. Such fluorochemicals and their preparation are well known and may be prepared by reacting a precursor fluoroamine or alcohol with a suitable anhydride or isocyanate, for example, the reaction of N-ethyl perfluorooctanesulfonamidoethanol and 2,4-tolylene diisocyanate in a mole ratio of 2:1 to provide a bis-urethane polymer containing 15 to 30% by weight fluorine.

Other compounds include those formed by reacting polymethacrylate with the $C_4$ to $C_{12}$ product formed by reacting tetrafluoroethylene with a chain transfer agent such as HO—$CH_2CH_2$—Cl. Normally, while sufficient chain transfer agent is added to provide a desired chain length (e.g., $C_8$), the product also contains $C_4$ to $C_8$ and $C_8$ to $C_{12}$ compounds.

The organo-zirconates useful in the subject invention may be represented by the formulas:

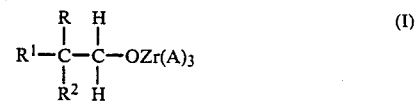

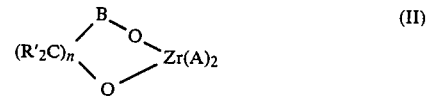

With respect to the neoalkoxy zirconates of Formula I, R, $R^1$ and $R^2$ are each a monovalent alkyl, alkenyl, alkynyl, aralkyl, aryl or alkaryl group having up to 20 carbon atoms or a halogen or ether substituted derivative thereof, and, in addition, $R^2$ may also be an oxy derivative of said groups. The various R, $R^1$ and $R^2$ may each contain up to 3 ether oxygen or halogen substituents, provided the total number of carbon atoms for each such R group does not exceed 20, inclusive of the carbon atoms contained in substituent portions.

Each A group may be independently selected from diester phosphate (($R^3$O)($R^4$O)P(O)O—), diester pyrophosphate (($R^3$O)($R^4$O)P(O)OP(O)), oxyalkylamino ($R^5R^6$N$R^7$O—), or sulfonyl (ArS(O)$_2$O—). Each group may contain up to 30 carbon atoms. Ar, in the above formulas, may be a monovalent aryl or alkaryl group having from 6 to about 20 carbon atoms, optionally containing up to 3 ether oxygen substituents, and substituted derivatives thereof wherein the substitutions are up to a total of 3 halogens or amino groups having the formula NR$^8$R$^9$ wherein R$^8$ and R$^9$ are each hydrogen, an alkyl group having from 1 to 12 carbon atoms, an alkenyl group having from 2 to 8 carbon atoms, a cycloalkyl group having from 3 to 12 carbon atoms, an an aryl group having from 6 to 12 carbon atoms; and R$^3$ and $R^4$ may each be the same group as R, $R^1$ and Ar. $R^5$ and $R^6$ may be hydrogen, an alkyl or aminoalkyl group having from 1 to 15 carbon atoms and $R^7$ may be an alkylene group having from 1 to 6 carbon atoms or an arylene group having from 6 to 10 carbon atoms or a combination thereof.

With respect to zirconium chelates of Formula II above, A is as defined above; B is an $R'_2C$ group or a carbonyl group; R' is a hydrogen or hydrocarbyl group having from 1 to 6 carbon atoms; and n is 1 or 2.

Particularly preferred examples of the R, $R^1$ and $R^2$ groups are alkyl having from 1 to 8 carbon atoms; aryl and aralkyl having from 6 to 10 carbon atoms, such as benzyl, phenyl, naphthyl, tolyl, xylyl; halogen-substituted aryl such as bromophenyl; allyloxy-substituted alkyl having from 4 to 20 carbon atoms; and allyloxy-substituted aryl having from 9 to 20 carbon atoms. Where $R^2$ is an oxy derivative, the most preferred compounds are the alkoxy derivatives having from 1 to 3 carbon atoms and the phenoxy group.

Preferred $R^3$ and $R^4$ groups are alkyl groups having from 1 to 12 carbon atoms, aryl and alkaryl groups having from 6 to 12 carbon atoms and ether-substituted alkyl having from 3 to 12 carbon atoms.

Examples of specific R, $R^1$, $R^2$, $R^3$ and $R^4$ groups are: methyl, propyl, cyclohexyl, 2,4-dimethoxybenzyl, 1-methyl-4-acenaphthyl-2-ethyl-2-furyl and methallyl. $R^2$, in addition, may be methoxy, phenoxy, naphthenoxy, cyclohexene-3-oxy, 4-isobutyl-3-methoxy, 1-phenanthroxy and 2,4,6-trimethylphenoxy.

Examples of A ligands useful in the practice of this invention are likewise numerous. These include diester phosphates such as dibutyl, methylphenyl, cyclohexyl, lauryl and bismethoxyethoxyethyl phosphate and their pyrophosphate analogs as well as aryl sulfonyl groups such as phenylsulfonyl, 2,4-dibutyl-1-naphthalene sulfonyl and 2-methyl-3-ethyl-4-phenanthryl sulfonyl.

The treatment of the halogenated organic compounds with the organo-zirconates described herein results in the formation of new compositions as depicted in Formulas III and IV below. A proposed reaction mechanism is set forth below:

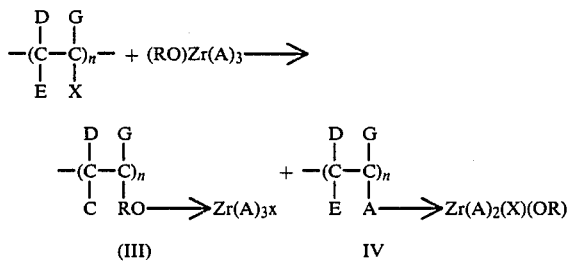

(III)    IV wherein each A is as defined in Formula II, (RO) is defined as for R, R', $R^2CCH_2O$ in Formula II, D, E and G are each monovalent ligands independently chosen from among hydrogen, halogen or monovalent hydrocarbyl groups having from 1 to 10 carbon atoms each, and n represents the repeating units in the organic chain and may be from 1 to 10,000, preferably from 1 to 1,000.

The selection of the preferred specific organo-zirconate compound is dependent on the particular substrate to which the halocarbon is to be bonded. For example, in the case of bonding halocarbons to metals such as copper, aluminum and iron, the pyrophosphate and the phosphate species of both the neoalkoxy and the chelate zirconates are preferred. The phosphates exhibit the most efficacious behavior, superior results being achieved with such compounds as zirconium IV, neoalkenylato, tris(dioctyl)phosphato-O.

Where polyolefins form the substrates (that is, materials such as polyethylene, polypropylene and copolymers and terpolymers of such compounds), the diester phosphates again are the most preferred. However, the aryl zirconates such as zirconium IV neoalkenylato, tris neodecanolato-O may also be used. Again, both the neoalkoxy and the chelate types function well. For styrenic plastics (such as polystyrene and polyalphamethyl styrene), the best performance is from the sulfonyl zirconates, particularly the alkyl benzyl sulfonyl type such as zirconium IV neoalkenylato, tris dodecylbenzene sulfonato-O. The phosphate diesters are also effective. With regard to thermoplastic polyesters such as Mylar, bonding is best when using alkyl or aryl amino zirconates. An example of such compound is zirconium IV neoalkenylato, tris(2-ethylene diamino)ethylato and zirconium IV neoalkenylato, tris(3-amino)-phenylato.

Other substrates to which the adhesivity of halocarbons may be enhanced include natural and synthetic fibers such as wool, cotton, nylon, polyesters, and acrylics. The treatment of such materials is particularly useful to enhance the retention of soil-resistant agents such as Scotchgard brand stain repellent (3M) and Zepel and Teflon (E. I. DuPont de Nemours).

The organo-zirconate compounds may be applied to the surface of the halocarbon and/or substrate by a variety of means well known to those skilled in the coatings art. For example, roll coating, spraying lamination or other thin film producing technique, preferably with a diluent, may be used to yield a final coating of the organo-zirconate which is less than approximately 50 angstroms thick. Whether to treat the halocarbon, the substrate, or both of the surfaces to be bonded is a matter of choice readily determined by the applicator.

Alternatively, and more preferably, the organo-zirconate compound is admixed with the halocarbon during its processing prior to application to the surface of the substrate. If the halocarbon is to be bonded to a substrate whose processing characteristics are compatible with the stability of the organo-zirconate compounds, it is frequently practicable to incorporate the organo-zirconate during the processing of the substrate. This technique provides an ample supply of the bonding agent.

Any combination of the aforegoing means may be utilized to further enhance the bonding between such substrates and targeted halocarbons. Processing conditions required to effect the desired bonding are primarily determined by the coating method employed for primer materials and/or the processing requirements of substrate and halocarbon when the integral addition is used.

It has been found that the halocarbons may be bonded effectively to a variety of substrates by following the teaching of the invention. Substrates including hydrocarbons, polycarboxylic acid derivatives, such as polyesters, polyamides, and polyurethanes, materials with pendent carboxyl or derivative groups, acrylonitrile, butadiene and styrene, polyacrylates, ethylene vinyl, and the like as well as most metals can be bonded. When contact bonding is used, the temperatures may vary widely, e.g., from about 0° C. to approximately 400° C., preferably from about 50° C. to 300° C. Where integral addition to either the polymeric substrate or to the halocarbon component is used, it is best to employ contact temperatures of from about 100° C. to approximately 300° C. At temperatures below 100° C., long contact times of from 1 to approximately 20 minutes may be required, depending upon the substrate, to achieve optimum bonding characteristics. Long contact times at low temperatures are particularly advantageous when low contact pressures (i.e., below 1 gravity) are employed in the bonding process, especially when the integral as opposed to primer bonding is employed.

The specific mechanism of the enhanced bonding between halocarbons and suitable substrates is not fully understood. However, it has been established that in certain cases such bonding involves extraction of a halogen atom from the halocarbon and a substitution of one of the ligands attached to the organo-zirconate. The ligand appears to depend on the specific chemistry of the halocarbon and organo-zirconate employed, process conditions, and stereochemical factors, though other undetermined factors may control the ligand exchange. Subsequent bonding of the partially dehalogenated halocarbon to the substrate is strongly enhanced by the interaction between the newly attached ligands and the substrate and by the bonding of the ligand to the organo-zirconate and/or derivative products which, in turn, is bonded to the substrate.

Table 1 describes the organo-zirconates used in the Examples:

TABLE 1

| Code | Chemical Description |
| --- | --- |
| A | Zirconium IV 2,2-dimethyl-1-propanediolato, tris(diisooctyl) pyrophosphato-O |
| B | Zirconium IV (2,2-bis-2-propenolato-methyl) butanolato, tris(diisooctyl) pyrophosphato-O |
| C | Zirconium IV (2,2-bis-2-propenolato-methyl) butanolato, tris(diisooctyl) phosphato-O |
| D | Zirconium IV (2,2-bis-2-propenolato-methyl) butanolato, tris(2-ethylene diamino) ethoxylato |
| E | Zirconium IV (2,2-bis-2-propenolato-methyl) butanolato, tris(3-amino) phenylato |
| F | Zirconium IV 2,2-bis-propenolato-methyl, butanolato, tris(dodecyl, benzenesulfonato-O) |
| G | Zirconium IV 2-ethyl, 2-propenolato-methyl-1,3-propanediolato, bis-(2-acylamido) 2-propane sulfonato |
| H | Zirconium IV bis(2,2-bis 2-propeno-latomethyl) butanolato, cyclo(2,2-bis-2 propenolatomethyl) pyrophosphato 0,0 |
| J | Zirconium IV 2-ethyl, 2-propenolato-methyl-1,3-propanediolato adduct with 2 moles of N,N dimethylamino-propyl (2-methyl)-2-propenamide |

The following examples illustrate more specifically the instant invention:

EXAMPLE I

Bonding of Teflon to Copper Wire

A thin film of Compound C is coated on a copper wire with a saturated sponge just prior to co-extrusion of said wire with a Teflon fluoropolymer in a conventional crosshead extruder system. The peel strength of the Teflon coating primed copper wire is 8–9 lbs./in. as compared to 2–5 lbs./in. for a similarly prepared untreated coated wire. This enhancement of approximately twofold is a clear indication of the utility of the instant invention.

EXAMPLE II

Bonding of Chlorinated Polyethylene to Nylon 6

This example shows the embodiment of the invention where the primer is admixed with the polymer substrate. Chlorinated polyethylene (Dow Chemical Tyrin 566) was dissolved in mixed xylene solvent and diluted to a final concentration of 10 wt. %. Thereafter 0.5 wt. % based on polymer of various organo-zirconate compounds were introduced and the resulting solution applied via a doctor blade at a 2 mil thickness to Nylon 6. After evaporation of the solvent at ambient temperature, annealing and cooling to and conditioning at 25° C. for 24 hours, the resulting CPE/Nylon interface had the following peel strength:

TABLE 2

| Organo-zirconate Additive | Peel Strength lb./in. |
| --- | --- |
| None | 2–3 |
| A | 3.5–4 |
| B | 4.3–4.7 |
| D | 4.9–5.2 |
| E | 6.4–6.7 |

The above data show that the organo-zirconate compounds substantially enhance the bonding strength between chlorinated polyethylene and Nylon, two rather incompatible polymer species.

EXAMPLE III

Bonding of Polyvinylidene Fluoride to Polychloroprene

Polychloroprene (DuPont-Neoprene) was compounded with a combination of zinc oxide and magnesia curatives as well as 50 parts of carbon black per 100 parts of resin and 0.8 parts per 100 of the indicated organo-zirconate additive. The additive was added as a powder concentrate on a silica carrier. The compounded mixture was extruded over a polyvinylidene fluoride (PVDF) hose liner fed in a crosshead fashion. Peel strength of the liner from the resultant hose was measured and the results reported below:

TABLE 3a

| Organo-zirconate Additive | Peel Strength lb./in. |
| --- | --- |
| None | 5.7–6.4 |
| A | 6.8–8.1 |
| D | 8.0–8.3 |
| E | 8.7–9.0 |

Alternatively, the PVDF liner was coated with a 0.2 wt. % solution of the indicated organo-zirconate additive in 1,2-dimethoxyethane solvent. The coated PVDF liner was then crosshead extruded with the aforementioned polychloroprene formulation to which no additive was introduced. Peel strengths of resulting products are given in Table 3b.

TABLE 3b

| Organo-zirconate Additive | Peel Strength lb./in. |
| --- | --- |
| None | 5.7–6.4 |
| A | 6.6–7.1 |
| C | 6.2–6.7 |
| E | 7.5–8.0 |

The data in Tables 3a and 3b clearly show the efficacy of the organo-zirconates as bonding enhancers for the PVDF/polychloroprene system independently of whether said additives are introduced either integrally or as interfacial primers.

EXAMPLE IV

Bonding Chlorinated, Chlorosulfonated Polyethylene to Steel

A 12 wt. % solution of chlorinated, chlorosulfonated polyethylene (DuPont-Hypalon 40) in a 50/50 blend of toluene and tetrahydrofuran containing 10 wt. % litharge (dispersion) and 3 wt. % of well dispersed, finely divided litharge (curative) and 0.4 wt. % of the indicated organo-zirconate additive in toluene primer were sequentially roller coated onto said blasted steel. The resultant coating was cured by application of 350° F. heated air. The peel strength of the resulting coating was measured and reported below:

TABLE 4a

| Organo-zirconate Additive | Peel Strength lb./in. |
| --- | --- |
| None | 7.2–8.0 |
| B | 7.6–8.1 |
| C | 7.9–8.2 |
| D | 9.6–10.4 |
| E | 10.9–11.1 |

The coated steel was then exposed to 20% hydrochloric acid at ambient temperature for a period of 30 days. The exposed panels were then washed with water, dried and peel strength again measured. Results were as follows:

TABLE 4b

| Organo-zirconate Additive | Peel Strength lb./inc. |
| --- | --- |
| None | 2.1–3.0 |
| B | 6.9–7.8 |
| C | 7.4–7.8 |
| D | 5.4–6.2 |
| E | 11.6–12.1 |

The data given in Tables 4a and 4b show not only that the products of the invention have higher initial bond strength but also that the bond strength is maintained to an even greater degree after the laminate is exposed to the corrosive action of strong acid. It is believed that the enhanced flow-out and resultant reduced porosity of the polymer film upon the primed steel; the direct protection by the additive on the steel surface; and the formation of an acid—and moisture-resistant bond between the primer/polymer and the steel at the interface account for the improved results.

Note the anomalous increase in peel strength during the acid exposure of the sample made with Additive E. This may be a consequence of the prolonged contact period between the additive containing halogenated polymer coating and the steel during the test.

EXAMPLE V

Bonding Polyvinyl Chloride

Polyester adhesives were prepared by dispersing in a polyester resin (Reichhold #30,003) 10 wt. % of fumed silica (Cabosil M-5), optionally, 0.2 wt. % of the bonding agent identified in the table, and 0.5 wt. % of t-butyl perbenzoate. The resulting dispersion was deaerated by standing at ambient temperature for 24 hrs. Thereafter, it was applied via a doctor blade to a thickness of 1/1000" to a 1 sq. in. piece of 1/16" thick rigid PVC resin (GM 103 EP). A second piece of comparable material was placed upon the film and the resulting laminate was press cured at 25 psi at a temperature of 160° C. for 15 minutes. The sample was equilibrated to room temperature prior to measurement lap shear strength. Results are given in Table 5:

TABLE 5

| Additive | Lap Sheer Strength, psi |
| --- | --- |
| None | 640 |
| B | 2,170 |
| F | 2,490 |
| G | GT 5,800 (CF) |

The data show that additive "G" produced cohesive failure in the PVC as opposed to delamination. As a consequence, the laminate shear strength is limited by that of the resins being bonded rather than the adhesive or its adhesive value. This demonstrates the efficacy of the sulfonato derivatives of Zirconium IV as bonding agents for halogenated substrates.

EXAMPLE VI

Bonding Fluoroelastomers to Steel

Solutions of vinyl ester resin (Dow 8044) containing 0.2% of the additive set forth below, 0.5% of methyl ethyl ketone peroxide, 0.1% of dimethylaminotoluene, and 500 ppm of 12% cobalt naphthanate were prepared. These were each applied at a thickness of 5/1000" to mild steel following which the resultant coatings were sprayed with 3/1000" coating of Viton Type E Fluoroelastomer in a solution containing 40 wt. % tetrahydrofuran, 0.2% of the additive included in the vinyl ester resin, the balance methyl ethyl ketone. The coatings were allowed to age for 72 hours at ambient temperature after which peel strength was measured via 90° peel. Results are tabulated in Table 6:

TABLE 6

| Additive | Peel Strength, lb./in. |
| --- | --- |
| None | 2.7 |
| B | 4.3 |
| G | 6.7 |
| H | 6.2 |
| J | 5.9 |

The above results clearly show the marked improvement on peel strength imparted by the additive of the invention.

We claim:

1. A process for enhancing the bonding of a halocarbon to a substrate which comprises: treating the substrate, the halocarbon, or both with an organo-zirconate compound, said zirconate compound having appendant therefrom a phosphato, a pyrophosphato, an amino or a sulfonyl group.

2. A process for enhancing the bonding of a halocarbon to a substrate which comprises: treating the substrate, the halocarbon or both with an organo-zirconate compound having one of the following formulas:

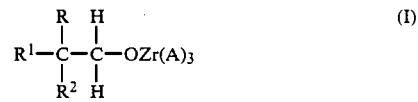

-continued

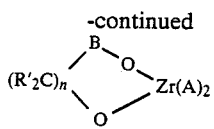 (II)

wherein R, R¹ and R² are each monovalent hydrocarbon groups or substantive derivatives thereof; the A groups are independently selected from diester phosphates, diester pyrophosphates, oxyalkylamino, oxyalkylarylamino, or sulfonyl groups; B is an R'₂C group or a carbonyl group; R' is a hydrogen group or an alkyl group having from 1 to 6 carbon atoms; and n is 1 or 2.

3. A process for bonding a halocarbon to a substrate which comprises: treating the surface of the substrate, the halocarbon or both with an organo-zirconate compound, said zirconate compound having appendant therefrom a phosphato, a pyrophosphato, an amino or a sulfonyl group and thereafter contacting the halocarbon with said substrate.

4. A process for bonding a halocarbon to a substrate which comprises treating the substrate, the halocarbon or both with an organo-zirconate compound having one of the following formulas:

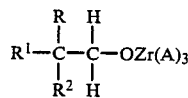 (I)

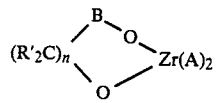 (II)

wherein R, R¹ and R² are each monovalent hydrocarbon groups or substantive derivatives thereof; the A groups are independently selected from diester phosphates, diester pyrophosphates, oxyalkylamino, oxyalkylarylamino, or sulfonyl groups; B is an R'₂C group or a carbonyl group; R' is a hydrogen group or an alkyl group having from 1 to 6 carbon atoms; and n is 1 or 2, and thereafter contacting the halocarbon with said substrate.

5. The process of claim 1, 2, 3 or 4 wherein the halocarbon is a fluorinated polymer.

6. The process of claim 5 wherein the fluorinated polymer is Teflon.

7. The process of claim 3 or 4 wherein the substrate is a metal or a polymeric material.

8. The process of claim 7 wherein the substrate material is a polyolefin, polyamide, styrenic, or a thermoplastic polyester.

9. A laminate comprising a halogenated organic compound and a substrate having coated at the interface thereof an organo-zirconate compound having one of the following formulas:

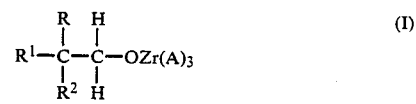 (I)

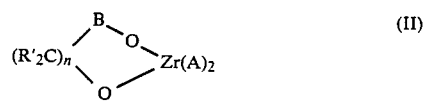 (II)

wherein R, R¹ and R² are each monovalent hydrocarbon groups or substantive derivatives thereof; the A groups are independently selected from diester phosphates, diester pyrophosphates, oxyalkylamino, oxyalkylarylamino, or sulfonyl groups; B is an R'₂C group or a carbonyl group; R' is a hydrogen group or an alkyl group having from 1 to 6 carbon atoms; and n is 1 or 2.

* * * * *